United States Patent
Wolf et al.

(10) Patent No.: US 9,573,557 B2
(45) Date of Patent: Feb. 21, 2017

(54) VALVE FOR A COLD GAS GENERATOR AND AIRBAG SYSTEM

(71) Applicants: Robert Bosch GmbH, Stuttgart (DE); Monica Nitschke, Asperg (DE)

(72) Inventors: Dirk Wolf, Renningen (DE); Rudolf Heinz, Renningen (DE); Andreas Illmann, Weil Der Stadt (DE); Horst Jung, Fellbach (DE); Nikola Jovicic, Stuttgart (DE); Stefan Woerz, Vaihingen/Enz (DE); Guenther Hohl, Stuttgart (DE); Uwe Iben, Calw-Heumaden (DE); Raed Hamada, Stuttgart (DE); Elmar Vier, Freiberg (DE); Werner Nitschke, Asperg (DE); Dietmar Kratzer, Tamm (DE); Peter Wassermann, Weil Der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/786,684

(22) PCT Filed: Feb. 27, 2014

(86) PCT No.: PCT/EP2014/053833
§ 371 (c)(1),
(2) Date: Oct. 23, 2015

(87) PCT Pub. No.: WO2014/173565
PCT Pub. Date: Oct. 30, 2014

(65) Prior Publication Data
US 2016/0059820 A1    Mar. 3, 2016

(30) Foreign Application Priority Data

Apr. 25, 2013  (DE) ......................... 10 2013 207 594

(51) Int. Cl.
*B60R 21/268* (2011.01)
*F16K 31/40* (2006.01)
(Continued)

(52) U.S. Cl.
CPC ........... *B60R 21/268* (2013.01); *F16K 31/406* (2013.01); *F16K 31/42* (2013.01); *B60R 2021/26094* (2013.01)

(58) Field of Classification Search
CPC ..................... B60R 21/268; B60R 2021/26094
(Continued)

(56) References Cited

U.S. PATENT DOCUMENTS

| 2,799,466 A | 7/1957 | Hickerson |
| 7,431,099 B2 * | 10/2008 | Thompson ............... A62C 3/07 137/491 |

(Continued)

FOREIGN PATENT DOCUMENTS

| DE | 42 24 927 | 2/1994 |
| DE | 10 2007 003 321 | 8/2008 |

(Continued)

OTHER PUBLICATIONS

International Search Report for PCT/EP2014/053833, dated Apr. 15, 2014.

*Primary Examiner* — Keith Frisby
(74) *Attorney, Agent, or Firm* — Norton Rose Fulbright US LLP; Gerard Messina

(57) ABSTRACT

A valve for a cold gas generator for an airbag in a vehicle includes: a valve chamber; a control chamber; a control piston; an overflow channel; a retaining element; and a shutoff element. The valve chamber includes an inlet from the cold gas generator and an outlet to the airbag. The control piston separates the control chamber and the valve chamber. The control piston is movable between an open position and a closed position, the control piston releasing the outlet in the open position and closing it in the closed (Continued)

position. The control piston has (i) a first active piston surface on the side of the valve chamber, and (ii) a second active piston surface on the side of the control chamber. The first piston surface is smaller than the second piston surface. The overflow channel fluidically connects the valve chamber and the control chamber to one another.

12 Claims, 4 Drawing Sheets

(51) Int. Cl.
*F16K 31/42* (2006.01)
*B60R 21/26* (2011.01)

(58) Field of Classification Search
USPC .................. 280/736, 742; 251/30.02, 43, 44
See application file for complete search history.

(56) References Cited

U.S. PATENT DOCUMENTS

| 2004/0000777 A1* | 1/2004 | Meduvsky | B60R 21/268 |
| | | | 280/742 |
| 2009/0079154 A1* | 3/2009 | Sheehan | B60G 17/01933 |
| | | | 280/124.16 |

FOREIGN PATENT DOCUMENTS

| DE | 102012210943 A1 * | 1/2014 | ............ F16K 1/303 |
| WO | WO 2008/040542 | 4/2008 | |
| WO | WO 2011/063375 | 5/2011 | |

* cited by examiner

VALVE FOR A COLD GAS GENERATOR AND AIRBAG SYSTEM

BACKGROUND OF THE INVENTION

1. Field of the Invention

The present invention relates to a valve for a cold gas generator for an airbag in a vehicle and to an airbag system and to a method for inflating an airbag.

2. Description of the Related Art

To activate an airbag, a gas is necessary, which may be provided rapidly to fill the airbag, before a person to be protected or a body part strikes an object to be cushioned. For this purpose, the gas may be generated pyrotechnically or a pressure reservoir, which contains the gas in compressed form, may be pierced. The pressure reservoir may also have a closure unit, which may be operated by an actuator.

Various principles may be used for generating gas for an airbag filling. The gas may be generated pyrotechnically and fill the airbag. In the case of pyrotechnics, a safety concept is necessary. Furthermore, hot gases require a special design of the airbag. Alternatively, a gas pressure reservoir may be pierced via a pyrotechnic trigger. The contained gas fills the airbag. The gas pressure reservoir may only be triggered once and a volume flow is not settable. The gas pressure reservoir may also be sealed via a (solenoid) valve. The solenoid valve opens when needed and the outflowing gas fills the airbag. A gas leak-tightness over the service life is to be ensured, to guarantee a function when needed.

Published German patent application document DE 10 2007 003 321 A1 describes a closure unit for a pressure reservoir of a cold gas generator which is fillable using pressurized gas.

BRIEF SUMMARY OF THE INVENTION

Against this background, the present invention provides a valve for a cold gas generator for an airbag in a vehicle, an airbag system, and finally a method for inflating an airbag using a valve.

Gas for filling an airbag may be kept ready in a pressure reservoir. The pressure reservoir may contain a larger quantity of gas than is required for an instantaneously desired filling quantity of an airbag. It is then advantageous to interrupt a filling procedure when the desired filling quantity is reached. An outflow of the gas out of the pressure reservoir may be interrupted for this purpose.

The compressed gas in the pressure reservoir may be used as an energy source for interrupting the outflow. For this purpose, the gas may be conducted into a chamber to exert force on a piston and move the piston, whereby an outlet out of the pressure reservoir is closed. To enable a preferably simple construction of such a closable valve, the piston may carry out a linear movement. In order that the force is sufficient to close the outlet, the piston may be designed to have a fluid-mechanical transmission ratio. For example, a stepped piston may have two pressure application surfaces of different sizes, which are situated opposite to one another. Due to the different sizes, a greater force results on the larger area in the event of equal fluid pressure on the pressure application surfaces. Internal resistances of the valve may be overcome by a force difference. The gas may be conducted in a throttled way into the chamber, so that a shutoff unit for controlling a gas flow may be dimensioned small and cost-effectively and may therefore have a lower power consumption. The valve may be held open in a starting position, to achieve a short response delay during the filling of the airbag. The pressure reservoir may be sealed by a closure, which is destroyed upon opening. The valve may thus be depressurized before the opening of the pressure reservoir.

A valve for a cold gas generator for an airbag in a vehicle is provided, the valve having the following features:
a valve chamber having an inlet from the cold gas generator and an outlet to the airbag;
a control chamber;
a movable control piston, which separates the control chamber and the valve chamber and is movable between an open position and a closed position, the control piston releasing the outlet in the open position and closing it in the closed position, the control piston having a first active piston surface on the side of the valve chamber and having a second active piston surface on the side of the control chamber, the first piston surface being smaller than the second piston surface;
an overflow channel, which fluidically connects the valve chamber and the control chamber to one another;
a retaining element for holding the control piston in the open position, when the valve is in the no-load condition; and
a shutoff element for adapting a fluid stream through the overflow channel, to control a pressure buildup in the control chamber for moving the control piston into the closed position.

A valve chamber and a control chamber may be understood as cavities in a housing of the valve. A control piston may be a stepped piston. The control piston may also include the first piston surface and the second piston surface, which is directly coupled thereto. For example, the piston surfaces may be coupled via a piston rod.

The shutoff element may be situated in the overflow channel between the valve chamber and the control chamber. The fluid stream may be directly controlled by an arrangement in the overflow channel. If the overflow channel extends in the housing, the shutoff element may be situated in a constructionally optimized manner.

The control chamber may have an outlet for the fluid stream. The shutoff element may be situated in the outlet. The fluid stream may be indirectly controlled by an arrangement of the shutoff element downstream from the control chamber. The shutoff element may be less loaded by the pressure, since the overflow channel acts as a throttle and limits the fluid stream.

The overflow channel may be designed as at least one passage borehole through the control piston. The overflow channel may therefore be designed to be very short to ensure a rapid response.

A gap seal and alternatively or additionally a contact sealing element may be situated between the control piston and a wall of the control chamber and alternatively or additionally a wall of the valve chamber. A leakage flow between the control piston and the housing may be reduced by a sealing element. A gap seal may have a high flow resistance. A contact seal may be a flexible element, for example. The gap seal may reduce the friction between the control piston and the housing. The contact seal may prevent the leakage flow nearly completely.

The retaining element may be designed as the sealing element, the control piston being held by a friction force between the sealing element and the wall or between the sealing element and the control piston in the open position. The sealing element may fulfill multiple functions. The valve may thus be designed more simply.

The retaining element may be designed to exert a force on the control piston, to hold the control piston in the open position. The retaining element may be a force accumulator. The control piston may be pressed or drawn into the open position by the force. The filling of the airbag may take place without delay due to the holding in the open position.

The retaining element may be designed as a spring, which is situated between a support surface of the control piston and a support surface on a housing of the valve. A spring may carry out multiple movements. The valve may thus be activated multiple times. The force may be proportional to a spring travel. The spring may react rapidly.

The valve may have an actuator for moving the control piston out of the open position, the actuator being mechanically coupled to the control piston. The valve may be activated very rapidly by an actuator. The actuator may initially push the control piston very rapidly. The fluid stream may complete the movement up into the closed position.

The control piston may have a stop surface for delimiting a stroke of the control piston between the open position and the closed position. The retaining element may be protected by a stop surface against an unmoved part of the valve.

Furthermore, an airbag system having the following features is provided:
a cold gas generator, which is designed to provide an overpressure at an interface in response to an activation signal; and
a valve according to the approach provided here, the inlet into the valve chamber being connected to the interface of the cold gas generator, the outlet out of the valve chamber being designed as an interface to an airbag.

A cold gas generator may have a pressure reservoir, which may be opened by an activation signal to provide an overpressure.

Furthermore, a method for inflating an airbag using a valve according to the approach provided here is presented, the method including the following steps:
providing an overpressure in the valve chamber using the cold gas generator; and
adapting the fluid stream through the overflow channel using the shutoff element, to control the pressure buildup in the control chamber to move the control piston into the closed position.

DETAILED DESCRIPTION OF THE INVENTION

Figure 1:
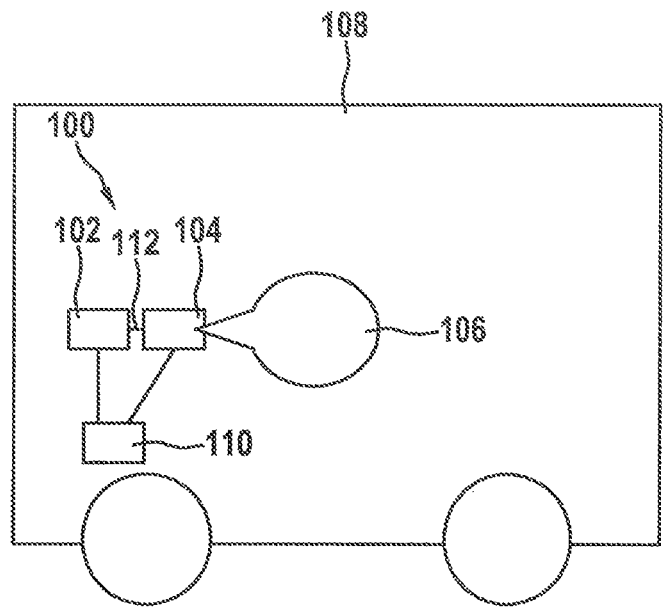
FIG. 1 shows a schematic representation of a vehicle having an airbag system according to one exemplary embodiment of the present invention.

In the following description of advantageous exemplary embodiments of the present invention, identical or similar reference numerals are used for the similarly acting elements shown in the various figures, a repeated description of these elements being omitted.

FIG. 1 shows a block diagram of an airbag system 100 according to one exemplary embodiment of the present invention. Airbag system 100 includes a cold gas generator 102 and a valve 104. Airbag system 100 is connected to an airbag 106 of a vehicle 108. The airbag may be referred to as an air cushion or airbag. Vehicle 108 may represent a road vehicle. Airbag 106 is designed to protect a vehicle occupant from injuries in the event of a collision of vehicle 106. Cold gas generator 102 is designed to provide an overpressure at an interface 112 in response to an activation signal from an airbag control unit 110. For this purpose, cold gas generator 102 has a pressure tank, which is sealed fluid-tight by a bursting disk. The bursting disk encloses a gas, which is under high overpressure, in the pressure tank. In response to the activation signal, the bursting disk is destroyed. The gas thus flows out of the pressure tank and is conducted via interface 112 to valve 104. Valve 104 is described in FIG. 2. Valve 104 has a valve chamber including an inlet at interface 112 and an outlet to airbag 106, a control chamber, a movable control piston, an overflow channel, a retaining element, and a shutoff element. The inlet into the valve chamber is connected to interface 112 of cold gas generator 102. The outlet out of the valve chamber is designed as the interface to airbag 106.

According to one exemplary embodiment, valve 104 for cold gas generator 102 is designed to have a stepped piston, valve 104 being open when deenergized. Special elements of a (slide) valve 104 are used for repeated shutting off, setting, and opening of a high (gas) volume flow, in particular for filling airbag 106 in a vehicle 108, as described in greater detail hereafter.

Figure 2:
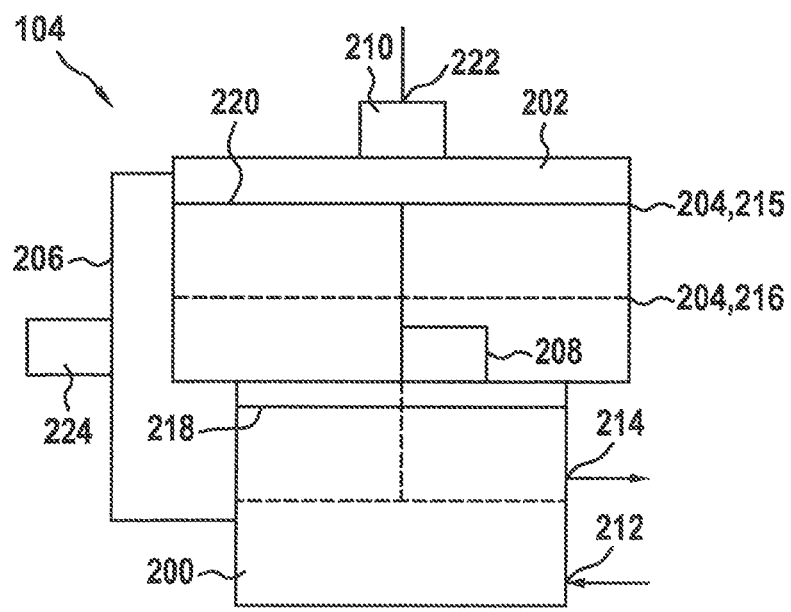
FIG. 2 shows a block diagram of a valve according to one exemplary embodiment of the present invention.

FIG. 2 shows a block diagram of a valve 104 according to one exemplary embodiment of the present invention. Valve 104 corresponds to the valve for the cold gas generator for the airbag in FIG. 1. Valve 104 includes a valve chamber 200, a control chamber 202, a movable control piston 204, an overflow channel 206, a retaining element 208, and a shutoff element 210. Valve chamber 200 includes an inlet 212 from the cold gas generator and an outlet 214 to the airbag (not shown). Control piston 204 separates control chamber 202 from valve chamber 200 and is movable between an open position 215 and a closed position 216. Control piston 204 releases outlet 214 in open position 215. In closed position 216, control piston 204 closes outlet 214. Control piston 204 has a first active piston surface 218 on the side of valve chamber 200. Control piston 204 has a second active piston surface 220 on the side of control chamber 202. First piston surface 218 is smaller than second piston surface 220. In this exemplary embodiment, first piston surface 218 is coupled via a piston rod with the second piston surface. Overflow channel 206 fluidically connects valve chamber 200 and control chamber 202 to one another. Retaining element 208 is designed to hold control piston 204 in open position 215 when valve 104 is in no-load condition. Shutoff element 210 is designed to adapt a fluid stream through overflow channel 206, to control a pressure buildup in control chamber 202 for moving control piston 204 into closed position 216.

When valve 104 is connected to the activated cold gas generator, valve chamber 200 is under a high overpressure due to the gas flowing out of the cold gas generator. The gas flows out through open outlet 214 in the direction of the airbag.

In one exemplary embodiment, shutoff element 210 is situated in overflow channel 206 between valve chamber 200 and control chamber 202. When shutoff element 210 is open, the fluid stream may flow through overflow channel 206 from valve chamber 200 into control chamber 202 and increase a pressure in control chamber 202. A pressure force on second piston surface 220 thus rises. When the pressure force is greater than a pressure force as a result of the overpressure of the cold gas generator on first piston surface 218 and a resistance due to retaining element 108, control piston 204 is moved into closed position 216, and the gas may no longer flow out of outlet 214 in the direction of the airbag.

In one exemplary embodiment, control chamber 202 has an outlet 222 for the fluid stream. In the exemplary embodiment, shutoff element 210 is situated in outlet 222. Overflow channel 206 has a throttle unit 224 here to limit the fluid stream. The fluid stream flows continuously through overflow channel 206 from valve chamber 200 into control chamber 202. When shutoff element 210 is open, the fluid stream flows through outlet 222 out of control chamber 202 and the pressure in control chamber 202 remains approximately at an ambient pressure and therefore significantly less than the overpressure in valve chamber 200. When shutoff element 210 is closed, the pressure rises in control chamber 202 until the pressure force on second piston surface 220 is greater than the pressure force as a result of the overpressure of the cold gas generator on first piston surface 218 and the resistance by retaining element 108. Control piston 204 is moved into closed position 216.

In one exemplary embodiment, the overflow channel is formed as at least one passage borehole through control piston 204. The passage borehole connects first piston surface 218 directly to second piston surface 220. The passage borehole is formed having a small cross-sectional area, to generate a throttle action for limiting the fluid stream.

In one exemplary embodiment, a gap seal is situated between control piston 204 and a wall of control chamber 202. In one exemplary embodiment, a contact sealing element is situated between control piston 204 and a wall of control chamber 202. In one exemplary embodiment, a gap seal is situated between control piston 204 and a wall of valve chamber 200. In one exemplary embodiment, a contact sealing element is situated between control piston 204 and a wall of valve chamber 200. The gap seal is a contactless seal. The gap seal opposes the overpressure with a high dynamic resistance, so that a leakage flow through the gap seal is negligible. The leakage flow may be discharged through a relief borehole between first piston surface 218 and second piston surface 220. The contact sealing element is a flexible component, which is situated in a gap between the control piston and the wall. The leakage flow may be minimized by the contact sealing element.

In one exemplary embodiment, retaining element 208 is provided as the sealing element. Control piston 204 is held by a friction force between the sealing element and the wall or between the sealing element and control piston 204 in open position 215 as long as the pressure force as a result of the overpressure of the cold gas generator on first piston surface 218 and the resistance due to the sealing element are greater than the pressure force on second piston surface 220.

In one exemplary embodiment, retaining element 208 is designed to exert a force on control piston 204, to hold control piston 204 in open position 215.

Retaining element 208 is designed as a spring, for example, which supplements the pressure force as a result of the overpressure of cold gas generator on first piston surface 218 with a spring force. The spring force also acts when the cold gas generator is still closed. Spring 208 may be designed as a tension spring.

In one exemplary embodiment, retaining element 208 is designed as a compression spring, which is situated between a support surface of control piston 204 and a support surface on a housing of valve 104. The control piston is cylindrical, so that a coil spring may be situated more easily around control piston 204.

In one exemplary embodiment, valve 104 includes an actuator for moving control piston 204 out of open position 215. The actuator is mechanically coupled to control piston 204. The actuator transmits a mechanical impulse to control piston 204 in response to a closing signal, to overcome a mass inertia of control piston 204. The actuator has almost no response delay.

In one exemplary embodiment, control piston 204 includes a stop surface for delimiting a stroke of control piston 204 between open position 215 and closed position 216. The stop surface is provided circumferentially around control piston 204 and is designed to stop control piston 204 in the event of an impact.

In stepped piston 204, pressure differences on different piston surfaces 218, 220 effectuate the movement of main valve 104 with minimal use of magnetic force. The approach may be referred to as the pilot principle.

Figure 3:
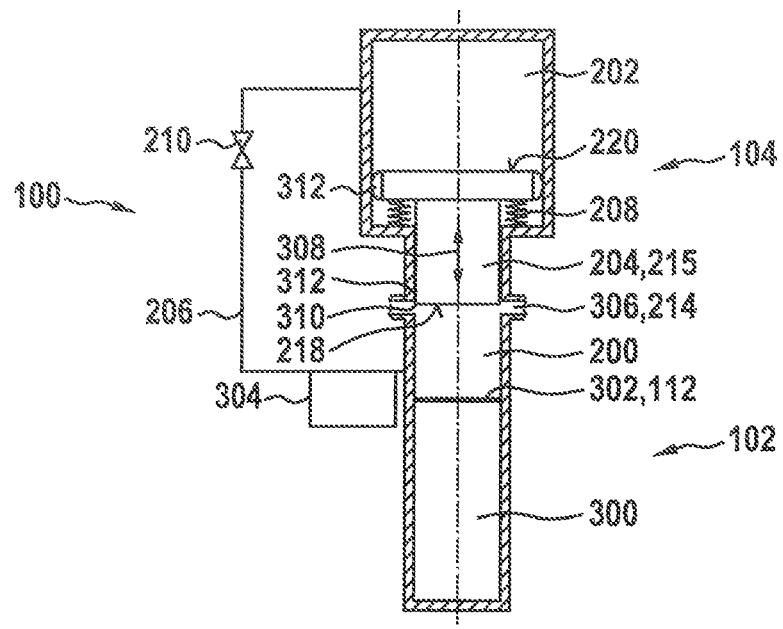
FIG. 3 shows a representation of an airbag system having an external overflow channel according to one exemplary embodiment of the present invention.

FIG. 3 shows a representation of an airbag system 100 including an external overflow channel 206 according to one exemplary embodiment of the present invention. Airbag system 100 includes, as in FIG. 1, a cold gas generator 102 and a valve 104. Cold gas generator 102 includes a pressure tank 300, a bursting disk 302, and a unit 304 for opening bursting disk 302. Pressure tank 300 is designed as a pressure resistant cylindrical container having an opening. Bursting disk 302 spans the opening and closes pressure tank 300 gas-tight. Bursting disk 302 is designed to close the container pressure-tight in all operating conditions. Unit 304 for opening is designed to overload the strength of bursting disk 302 in response to the activation signal. Unit 304 is connected via an electrode to bursting disk 302. For example, unit 304 may locally overload a load of bursting disk 302 by a pyrotechnic charge applied locally to bursting disk 302, whereby the material of bursting disk 302 fails and may no longer withstand the gas pressure in the container. The material may also be locally overheated to reduce the strength. Bursting disk 302 represents the interface to valve 104. Valve 104 includes, as in FIG. 2, a valve chamber 200, a control chamber 202, a movable control piston 204, an overflow channel 206, a retaining element 208, and a shutoff element 210. Valve chamber 200 directly adjoins bursting disk 302 here. Valve chamber 200 is cylindrical, like pressure tank 300. The wall of valve chamber 200 has multiple boreholes 306, which are formed as outlet 214. Boreholes 306 penetrate the wall of valve chamber 200 at a common height. Control chamber 202 is also cylindrical. Control chamber 202 has a larger diameter than valve chamber 200. The wall follows the jump of the diameter to the height of control piston 204. At the jump, the wall forms a circumferential shoulder. Control piston 204 is designed as a cylindrical stepped piston for closing. Control piston 204 is solid and has a slightly smaller diameter in the area of valve chamber 200 than valve chamber 200. In the area of control chamber 202, control piston 204 has a slightly smaller diameter than control chamber 202. Therefore, the control piston has a circumferential shoulder. The shoulder is situated opposite to the shoulder of the wall. Retaining element 208 is situated between the shoulders. Retaining element 208 is designed as a spring or spring element. Spring element 208 has an action direction which is aligned in a movement direction 308 of control piston 204. Movement direction 308 corresponds to a longitudinal axis of control piston 204. Retaining element 208 holds the control piston in the open position as long as bursting disk 302 or bursting diaphragm is intact and ambient pressure prevails in control chamber 202 and valve chamber 200. In open position 215, a control edge 310 of control piston 204 is situated in such a way that boreholes 306 in the wall of valve chamber 200 are open. When control piston 204 is moved into the closed position (not shown here), control edge 310 moves in front of boreholes 306 and control piston 204 conceals boreholes 306, so that boreholes 306 are closed. When control piston 204 is moved into the closed position, spring element 208 is compressed. A gap is formed as gap seal 312 between control piston 204 and the wall of valve chamber 200. A gap seal 312 is also formed between the wall of control chamber 202 and control piston 204. Valve chamber 200 is effectively fluidically separated from control chamber 202 by gap seals 312. Overflow channel 206 penetrates the wall of valve chamber 200 and the wall of control chamber 202. Outside the wall, overflow channel 206 bridges control piston 204 both in open position 215 shown, and also in the closed position (not shown). Shutoff element 210 is integrated as an overflow valve in overflow channel 206.

When bursting disk 302 is open and overpressure prevails in valve chamber 200, control piston 204 is held in open position 215 by the overpressure on its first piston surface 218.

When shutoff element 210 unblocks overflow channel 206, gas flows out of valve chamber 200 through overflow channel 206 into control chamber 202. Due to the overflow, a pressure rises in control chamber 202. When the pressure in control chamber 202 exerts a pressure force on second piston surface 220 which is greater than the pressure force due to the overpressure in valve chamber 200 and the spring force of retaining element 208, control piston 204 is moved into the closed position and closes outlet 214.

Passage borehole 206 is schematically shown here. Overflow channel 206 may also be provided by an eccentric or external line connection 206 or borehole.

Pilot valve 210 is situated in external line connection 206 here. In the case of an external line 206 as in FIG. 3, the construction is less integrated, and may therefore be modularly constructed better. The possibility exists of replacing individual components, depending on the application, thereby improving the accessibility.

Figure 4:
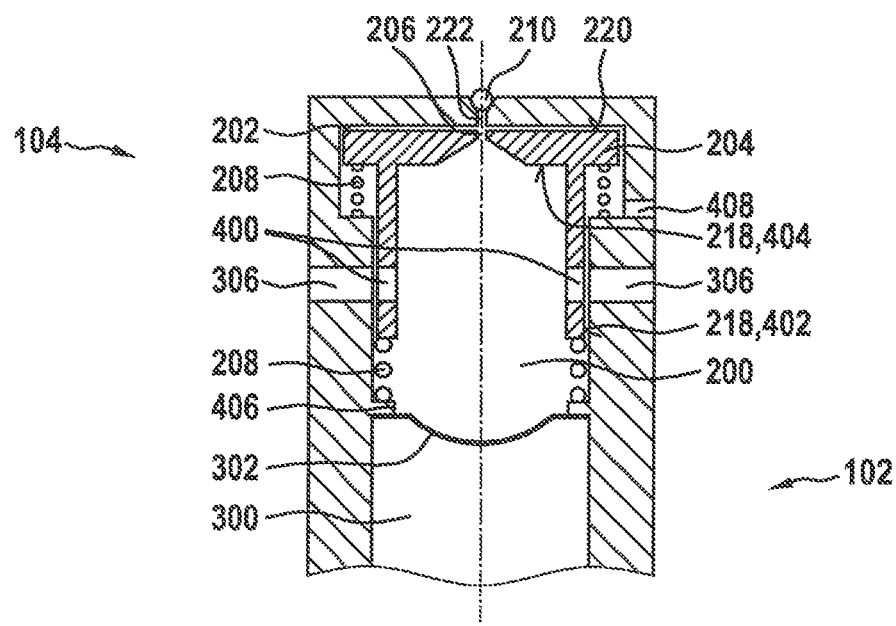
FIG. 4 shows a representation of a valve having a centrally situated overflow channel according to one exemplary embodiment of the present invention.

FIG. 4 shows a representation of a valve 104 including centrally situated overflow channel 206 according to one exemplary embodiment of the present invention. Valve 204 essentially corresponds to the valve in FIG. 3. In contrast to the valve in FIG. 3, valve 104 does not have a linear control edge. The control edge is formed here by outflow boreholes 400, which are situated congruently with boreholes 306 in the wall of valve chamber 200 in the open position shown. Control piston 204 has a twist lock, so that outflow boreholes 400 are also aligned congruently with boreholes 306 after a movement of control piston 204. Control piston 204 is designed to be hollow here, having thin wall thicknesses. Control piston 204 shown has a continuous second piston surface 220, while first piston surface 218 is divided into two partial surfaces. First piston surface 218 is formed by a ring-shaped cup edge 402 and a circular cup bottom 404. Surface components which are aligned transversely to the movement direction of control piston 204 do not act as active piston surfaces.

Control piston 204 may also be designed in such a way that first piston surface 218 is formed continuously, while second piston surface 220 is composed of partial surfaces. The design of control piston 204 is less relevant for the control action.

As in FIG. 3, retaining element 208 is designed as a spring element. Spring 208 is designed as a coil spring here, which is conceived as a compression spring and is supported on the shoulder of control piston 204 and the shoulder of the wall.

In one exemplary embodiment, spring 208 is supported on cup edge 402 and a ring-shaped circumferential projection 406 around valve chamber 200. Bursting diaphragm 302 of cold gas generator 102 is supported on a side of projection 406 opposite to spring 208. Bursting diaphragm 302 is curved. Bursting membrane 302 is curved against the overpressure in pressure tank 300.

Control piston 204 has centrally situated overflow channel 206. Overflow channel 206 is provided as a borehole having a small diameter through cup bottom 404. Borehole 206 acts like a throttle, by limiting the possible fluid stream between chambers 200, 202. Borehole 208 is generously chamfered and therefore very short. Control chamber 202 has a very small volume when control piston 204 is situated in the open position. Second piston surface 220 is located almost on a rear wall of control chamber 202. An outlet 222 is situated in the rear wall. Outlet 222 has a larger flow cross section than borehole 206. Outlet 222 thus has a lower fluid resistance than borehole 206. Due to the lower fluid resistance, with open outlet 222, overpressure cannot build up in control chamber 202. Shutoff element 210 is situated in outlet 222. Shutoff element 210 is designed to close outlet 222 to enable an overpressure in control chamber 202.

In one exemplary embodiment, valve 104 for a cold gas generator includes a stepped piston 204, which is open when deenergized and has a centrally situated connecting borehole 206.

Stepped main slide piston 204 is opened by a spring 208 when deenergized. Main slide piston 204 has a very short connecting borehole 206 from its front side 218 to its rear side 220. Front side 218 has a small active pressure surface in the opening direction. Rear side 220 has a larger active pressure surface in the closing direction. No time and energy losses thus arise during initial triggering of the pressure reservoir. The gas may flow out to the airbag immediately. The first airbag filling therefore takes place rapidly. Due to the low flow losses and the brief time delay during the pressure buildup on slide rear side 220, valve 104 may be shut off rapidly again and the gas volume flow may be interrupted.

A bursting disk 302, which is connected gas-tight to pressure reservoir 300, encloses the gas, which is under high pressure, with long-term leak tightness. The gas expulsion may be triggered, for example, by a pyrotechnic squib.

Slide piston 204 is constructed as stepped. Piston 204 has a small active pressure surface 218 in the opening direction and a larger active pressure surface 220 in the closing direction. A force transmission ratio may thus be achieved, which only requires little installed power for pilot valve 210. Control piston 204 is constructed as cup-shaped. Radial outflow boreholes 400 are located close to "cup edge" 402. Alternatively, one outflow borehole 400 may be used. Alternatively, outflow borehole 400 may not be provided as solely radial. Momentum forces during the gas outflow may be used for moving the piston. Alternatively to outflow boreholes 400, a "cup edge" 402 may itself be provided as a closing edge or outflow edge as in FIG. 3. A higher force component acting in an opening way may result. The force component may be taken into consideration in a design of the force budget. Measures for precisely angled guiding for pairing and avoiding overlaps of piston boreholes 400 with housing boreholes 306 may be omitted.

"Cup bottom" 404 of control piston 204 is very thin. Passage borehole 206, which is housed centrally or alternatively eccentrically therein, is therefore very short and only generates very low pressure losses from the beginning via the progression until the end as a result of its design.

Pilot valve 210 is favorably placed in the immediate vicinity of this passage borehole 206. Alternatively, multiple eccentrically situated pilot valves 210 may be used. Pilot valve 210 is designed as a solenoid valve which is closed when deenergized. Alternatively, pilot valve 210 may be designed to be open when deenergized. Pilot valve 210 may also be designed with an actuation other than electromagnetic actuation. Connecting borehole 222 to pilot valve 210 and the dimension design of valve seat, sealing element, and valve lift are advantageously designed with respect to low energy or power consumption, large volume flow, large settable pressures, and low pressure losses.

Slide piston 204 is deenergized in the open position as a result of a compression spring 208, which may alternatively be provided as a tension spring. Compression spring 208 is housed in the steps of slide piston 204. Alternatively, other installation positions are possible, for example, on the end face or "cup edge" 402 of slide piston 204. Compression spring 208 is preferably designed as a coil spring; alternatively, other types are possible, for example, as a leaf spring, spring washer, or spring elements made of plastic. Additionally and preferably, compression spring 208 may be weakly pre-tensioned and may have a soft characteristic curve, so that it has just enough force to press slide 204 into the open position or to exert a small amount of counterforce when slide 204 is to be pushed into the closed position by pressure buildup in space 202 between the pilot valve seat and "cup bottom" 220. The installation space for compression spring 208, which is also the displacement for large piston diameter 220, is connected using one or more boreholes 408 to the atmosphere or another low-pressure space.

No or a reduced resistance force thus results against the (rapid) movement of slide piston 204 due to gas pressure in the spring space or against the rapid volume change of this displacement. A leak may also be discharged from the housing through gap seals of control piston 204.

In one exemplary embodiment, the valve includes a pilot valve 210, of which only the sealing element in the valve seat is shown. Directly adjoining the seal seat, valve 104 has a connecting borehole 222 between a control chamber 202 and pilot valve 210. A control piston 204 having a large diameter is situated in control chamber 202. Control piston 204 is sealed off from the housing via a (gap) seal. A passage borehole 206 is situated in a bottom 220 of control piston 204. A weak compression spring 208 is situated in a spring space borehole. On a second side 218, control piston 204 has a small diameter and is also sealed off from the housing via a (gap) seal. Control piston 204 has outflow boreholes 400 to the airbag. Outflow boreholes 400 of control piston 204 are aligned correspondingly to boreholes 306 in the housing. Alternatively, the control piston has a control edge on cup edge 402. A spring 208 may also engage on cup edge 402.

A gas tank 300 is closed pressure-tight by a bursting disk 302. Control piston 204 is open when deenergized. Spring 208 holds slide 204 in the open position when deenergized.

In one exemplary embodiment, pilot valve 210 is closed when deenergized.

In one exemplary embodiment, pilot valve 210 is open when deenergized.

Control piston 204 enables a force transmission ratio. As a result, only a low power of pilot valve 210 is necessary. Short passage borehole 206 having a small pressure drop enables rapid closing of valve 104. To reopen valve 104, the pressure in control chamber 202 is dissipated via pilot valve 210. A spring characteristic curve and/or spring pre-tension may be easily adapted to application-specific pressure conditions or pressure transmission ratios.

Figure 5:
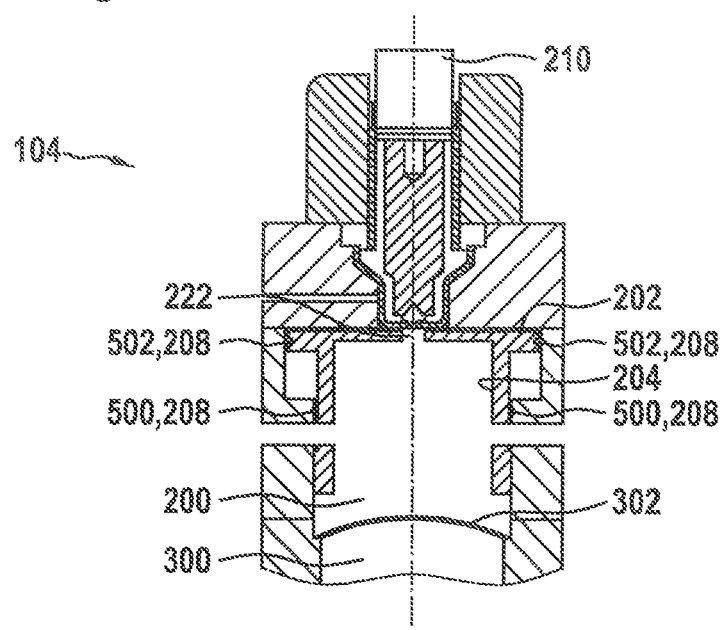
FIG. 5 shows a representation of a valve having contact seals according to one exemplary embodiment of the present invention.

FIG. 5 shows a representation of a valve 104 having contact seals 500, 502 according to one exemplary embodiment of the present invention. Valve 104 essentially corresponds to the valve in FIG. 4. In contrast to FIG. 4, valve 104 does not have a spring. Retaining element 208 is formed by contact seals 500, 502. First seal 500 bridges the gap between the wall of valve chamber 200 and control piston 204. First seal 500 is situated in a groove in the wall and slides on control piston 204. Second seal 502 bridges the gap between the wall of control chamber 202 and control piston 204. Second seal 502 is situated in a groove in control piston 204 and slides on the wall of control chamber 202. Due to the direct contact between seals 500, 502 and the sliding surfaces, control piston 204 is held in the open position by a static friction force of seals 500, 502. Seals 500, 502 may also be installed individually. Double seals 500, 502 provide an improved sealing action. Shutoff element 210 is designed in this exemplary embodiment as an electromagnetically operated valve. The cover of the control chamber is provided here as a separate component. Outlet 222 is situated in the cover. Bursting diaphragm 302 is curved out of pressure tank 300. Bursting diaphragm 302 is supported on a shoulder. An electrode contacts bursting diaphragm 302 through the wall of valve 104, to transmit the pulse to destroy bursting diaphragm 302.

In one exemplary embodiment, the gap seals are replaced by seal rings 500, 502, for example, made of PTFE (polytetrafluoroethylene). Reduced gas leakage thus results. Alternatively or additionally, these seal rings 500, 502 may assume the function of retaining element 208 using a function similar to the "rollback behavior." Piston 204 is held in the open position or drawn into the open position. The compression spring may be omitted or may be designed to be smaller, weaker, and more cost-effective.

The brake pistons and brake linings are withdrawn from the brake disks during the brake disengagement by the rollback behavior of seals in the wheel brake cylinders.

In one exemplary embodiment, pilot valve 210 is taken over by other applications. For example, an outlet valve from ABS/ESP brake control systems may have been adapted.

Figure 6:
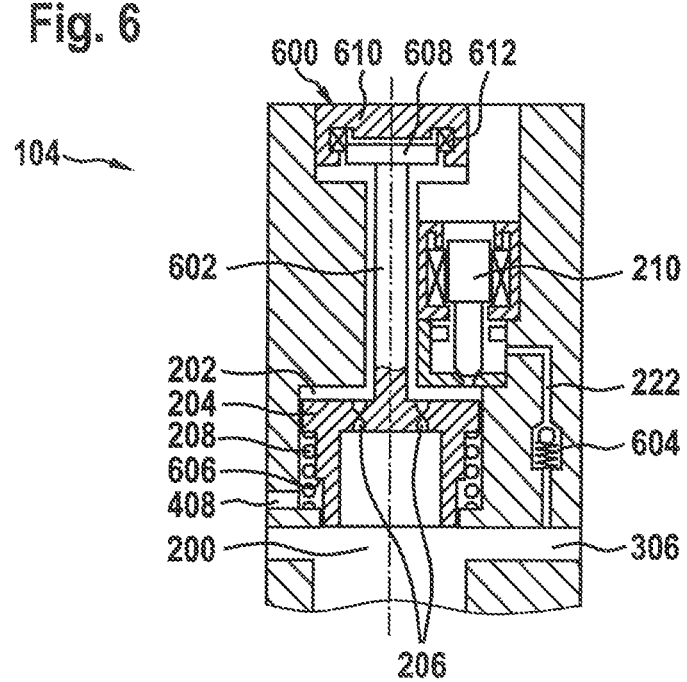
FIG. 6 shows a representation of a valve having an actuator according to one exemplary embodiment of the present invention.

FIG. 6 shows a representation of a valve 104 including actuator 600 according to one exemplary embodiment of the present invention. Valve 104 essentially corresponds to the valve in FIG. 4. Control piston 204 has a control edge 310 instead of the outlet openings as in FIG. 2. A twist lock may thus be omitted. Stepped piston 204 is coupled via a control rod 602 to actuator 600. Control rod 602 is connected centrally on second piston surface 220 to control piston 204. Multiple boreholes 604 for pressure equalization through control piston 204, laterally offset in relation to control rod 602, combine to form an overall cross section of overflow channel 604. Actuator 600 is designed as an electromagnetic actuator. Actuator 600 provides a mechanical pulse in response to a closing signal, which is transmitted from control rod 602 to control piston 204. To provide space for control rod 602, shutoff element 210, as the pilot valve, is situated laterally offset or eccentrically in relation to control rod 602. Shutoff element 210 is reachable via an installation opening in the housing for the pilot valve group. Pilot valve 210 includes a solenoid coil, an armature, a sealing element, and a valve seat. Outlet 222 is guided from shutoff element 210 via a check valve 604 to one of boreholes 306, to be able to use the fluid stream through overflow channels 206 to fill the airbag. Control cylinder 204 has a circumferential stop 606 or shoulder. Stop 606 is designed to stop the movement of control piston 204 in the closed position. Stop 606 prevents damage to retaining element 208. The wall of valve 104 has a vent hole 408 in the area of retaining element 208, to dissipate gas which reaches the area of retaining element 208 through the gap seals.

In one exemplary embodiment, valve 104 includes ribs, webs, and/or depressions on the bottom of control piston 204.

Valve 104 provided here is designed as a hydraulic slide valve for a high switching frequency during the opening and closing in the millisecond range. Provided special elements 600 increase the functional reliability and/or the efficiency of valve 104.

In one exemplary embodiment, an actuator 600 may exert forces or travels rapidly and with high frequency on (stepped) piston 204 of (slide) valve 104. A magnet armature 608 is connected via a rod 602 to (stepped) piston 204. Magnet armature 608 is, together with a stationary pole core 610, part of a magnetic field which is generated by a solenoid coil 612 as needed. Connecting rod 602 is attached centrally to magnet armature 608 and control piston 204.

In one exemplary embodiment, overflow channel or connection 206 between valve chamber and piston chamber 200 and control chamber and boost chamber 202 is eccentric. In one exemplary embodiment, connection 206 is provided as multiple connections 206 through the piston. In one exemplary embodiment, connection 206 is provided by an external line connection 206 or borehole as in FIG. 3. Pilot valve 210 is then also not integrated, but rather is installed in the connection line 206. In one exemplary embodiment, connection 206 is centrical through piston 204.

In one exemplary embodiment, outlet 222 of pilot valve 210 is connected to gas outlet 306 of valve 104 from the tank to the airbag and not to the atmosphere. In one exemplary embodiment, a (check) valve 604 is situated in this connection 222, to avoid undesirable repercussions of the high gas exit pressure on outlet 222 of pilot valve 210. The movement or load of control piston 204 may thus be positively influenced or damped.

A centrical attachment, for example, of an actuator 600 is made possible, connection borehole 206 being situated closer to pilot valve 210, which is also situated eccentrically. Special functional ranges may be depicted via a differing borehole and/or throttle geometry (for example, pressures, volume flows, temperatures, etc.).

In the approach provided here, the utilization of the gas stored in the tank is increased; the loss to the atmosphere is reduced due to the usage of the gas as an energy source for the force boosting. Only little electrical energy is thus necessary to switch valve 104.

Due to the use of cold gas, a less temperature-resistant, more cost-effective airbag material may be used. The gas high-pressure reservoir is provided with a bursting disk, which results in extremely good leak tightness, a very high level of gas availability over a long service life, and a high availability when needed. A small mechanical energy store 208 (compression spring) has a very high level of energy availability over the long service life and a high level of functional reliability when needed. All parts are located at an unambiguous position at all times of the product life due to retaining element 208, whereby the functional reliability is increased.

An axial attachment of valve 104 on the cold gas generator allows for a narrow construction of the assembly with advantages in the installation in a motor vehicle body, for example, in tubes, columns, etc.

Valve 104 provided here includes a few, simple parts having few gap seals, which results in a cost-effective construction. Pilot valve 210 allows for low costs of the installed electromagnet compared to directly activating solenoid valves. The approach provided here may also be used in other gas/media consumers in other applications such as industry.

In one exemplary embodiment of an actuating sequence, the bursting disk is opened in response to an activation signal. Since slide openings 306 are already open as a result of the force action of compression spring 208, the gas flows immediately and at high pressure out of the pressure reservoir and out of slide openings 306 in the direction of the airbag. Pilot valve 210, which is designed to be closed when deenergized here, is activated and the valve seat is opened. A part of the gas thus flows through multiple eccentric piston boreholes 206, at least one connecting borehole, and the pilot valve seat into outflow line 222 and via check valve 604 into outflow borehole 306 to the airbag. Alternatively, the gas may also flow out into the atmosphere or the surroundings.

High gas pressure is thus applied to the front side of slide piston 204, approximately ambient pressure prevailing on its rear side. Slide piston 204 is held in the open position by the large opening gas pressure force and compression spring 208.

When the gas outflow is to be ended, pilot valve 210 is deenergized. It closes. The same gas pressure builds up on the rear side of slide piston 204 as on the front side of slide piston 204.

Sticking or excessively small fill volumes on the piston bottom may be avoided by way of ribs/webs on the control piston bottom. An undelayed movement start of control piston 204 is thus assisted. Electromagnetic actuator 600 may assist this piston movement in the closing direction at the beginning by way of an auxiliary force, and/or may favorably influence it by force modulation during the closing movement and/or at the end thereof. Thus, for example, oscillations when striking against stops 606 may be counteracted by deceleration.

Due to the larger rear surface of control piston 204, a gas pressure force acting in a closing way results in total. It may overcome the compression spring force acting in an opening way as a result of the design. Slide piston 204 moves into the closed position and shuts off the gas flow. Compression spring 208 is protected from excessively strong load or from the blocking position by an additional shoulder 606 on control piston 204. At the same time, a stroke stop 606 thus results in the closed position for control piston 204.

When the gas outflow is to be restarted, pilot valve 210 is activated, the valve seat is opened, and the pressure in control chamber 202 dissipates, whereby the gas pressure on the front side of the control piston may move control piston 204 back into the open position.

Figure 7:
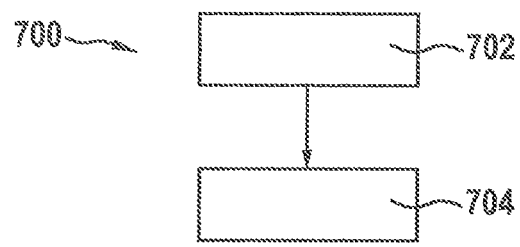
FIG. 7 shows a flow chart of a method for inflating an airbag according to one exemplary embodiment of the present invention.

FIG. 7 shows a flow chart of a method 700 for inflating an airbag using a valve according to one exemplary embodiment of the present invention. Method 700 has a step 702 of providing and a step 704 of adapting. In step 702 of providing, an overpressure is provided in the valve chamber using a cold gas generator. In step 704 of adapting, the fluid stream is adapted by the overflow channel using a shutoff element, to control a pressure buildup in a control chamber of the valve to move a control piston of the valve into a closed position.

The exemplary embodiments which are described and shown in the figures are only selected as examples. Different exemplary embodiments may be combined with one another in their entirety or with respect to individual features. One exemplary embodiment may also be supplemented with features of a further exemplary embodiment.

Furthermore, method steps according to the present invention may be carried out repeatedly and also in a sequence other than that described.

If an exemplary embodiment includes an "and/or" linkage between a first feature and a second feature, this is to be read to mean that the exemplary embodiment has, according to one specific embodiment, both the first feature and also the second feature and, according to another specific embodiment, either only the first feature or only the second feature.

What is claimed is:

1. A valve for a cold gas generator for an airbag in a vehicle, the valve comprising:
   a valve chamber including an inlet from the cold gas generator and an outlet to the airbag;
   a control chamber;
   a movable control piston which separates the control chamber and the valve chamber, wherein the movable control piston is movable between an open position and a closed position, the control piston releasing the outlet in the open position and closing the outlet in the closed position, the control piston having a first active piston surface on the side of the valve chamber and a second active piston surface on the side of the control chamber, the first piston surface being smaller than the second piston surface;
   an overflow channel which fluidically connects the valve chamber and the control chamber to one another;
   a retaining element for holding the control piston in the open position when the valve is in a no-load condition; and
   a shutoff element for adapting a fluid stream through the overflow channel, to control a pressure buildup in the control chamber for moving the control piston into the closed position.

2. The valve as recited in claim 1, wherein the shutoff element is situated in the overflow channel between the valve chamber and the control chamber.

3. The valve as recited in claim 2, wherein the control chamber has an outlet for the fluid stream and the shutoff element is situated in the outlet.

4. The valve as recited in claim 2, wherein the overflow channel is formed as at least one passage borehole through the control piston.

5. The valve as recited in claim 2, wherein at least one of a gap seal and a contact sealing element is situated between the control piston and at least one of a wall of the control chamber and a wall of the valve chamber.

6. The valve as recited in claim 5, wherein the retaining element is configured as the contact sealing element, and wherein the control piston is held by a friction force one of (i) between the contact sealing element and the wall or (ii) between the contact sealing element and the control piston in the open position.

7. The valve as recited in claim 6, wherein the retaining element is configured to exert a force on the control piston, to hold the control piston in the open position.

8. The valve as recited in claim 5, wherein the retaining element is configured as a spring situated between a support surface of the control piston and a support surface on a housing of the valve.

9. The valve as recited in claim 5, further comprising:
   an actuator mechanically coupled to the control piston and configured to move the control piston out of the open position.

10. The valve as recited in claim 9, wherein the control piston has a stop surface for delimiting a stroke of the control piston between the open position and the closed position.

11. An airbag system, comprising:
    a cold gas generator configured to provide an overpressure at an interface in response to an activation signal; and
    a valve including:
       a valve chamber including (i) an inlet connected to an interface of the cold gas generator and (ii) an outlet configured as an interface to an airbag;
       a control chamber;
       a movable control piston which separates the control chamber and the valve chamber, wherein the movable control piston is movable between an open position and a closed position, the control piston releasing the outlet in the open position and closing the outlet in the closed position, the control piston having a first active piston surface on the side of the valve chamber and a second active piston surface on the side of the control chamber, the first piston surface being smaller than the second piston surface;
       an overflow channel which fluidically connects the valve chamber and the control chamber to one another;
       a retaining element for holding the control piston in the open position when the valve is in a no-load condition; and
       a shutoff element for adapting a fluid stream through the overflow channel, to control a pressure buildup in the control chamber for moving the control piston into the closed position.

12. A method for inflating an airbag, comprising:
    providing a valve including:
       a valve chamber including (i) an inlet connected to an interface of the cold gas generator and (ii) an outlet configured as an interface to an airbag;
       a control chamber;
       a movable control piston which separates the control chamber and the valve chamber, wherein the movable control piston is movable between an open position and a closed position, the control piston releasing the outlet in the open position and closing the outlet in the closed position, the control piston having a first active piston surface on the side of the valve chamber and a second active piston surface on the side of the control chamber, the first piston surface being smaller than the second piston surface;
       an overflow channel which fluidically connects the valve chamber and the control chamber to one another;

a retaining element for holding the control piston in the open position when the valve is in a no-load condition; and a shutoff element for adapting a fluid stream through the overflow channel, to control a pressure buildup in the control chamber for moving the control piston into the closed position;

providing an overpressure in the valve chamber using the cold gas generator; and adapting the fluid stream through the overflow channel using the shutoff element, to control the pressure buildup in the control chamber for moving the control piston into the closed position.

\* \* \* \* \*